(12) United States Patent
Sato et al.

(10) Patent No.: US 6,908,218 B2
(45) Date of Patent: Jun. 21, 2005

(54) LIGHT SOURCE UNIT AND PROJECTOR TYPE DISPLAY DEVICE USING THE LIGHT SOURCE UNIT

(75) Inventors: Makoto Sato, Tachikawa (JP); Hideki Nakamura, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 37 days.

(21) Appl. No.: 10/461,770

(22) Filed: Jun. 13, 2003

(65) Prior Publication Data

US 2003/0231496 A1 Dec. 18, 2003

(30) Foreign Application Priority Data

Jun. 18, 2002 (JP) .......................................... 2002-177079
Jul. 3, 2002 (JP) .......................................... 2002-194605

(51) Int. Cl.[7] .............................................. F21V 13/04
(52) U.S. Cl. ...................... 362/268; 362/308; 362/347; 362/263
(58) Field of Search ................................ 362/268, 308, 362/347, 296, 263, 514, 516, 538, 560, 253, 328; 313/113

(56) References Cited

U.S. PATENT DOCUMENTS 4,958,909 A * 9/1990 Kubo .......................... 359/869
5,243,501 A * 9/1993 Makita et al. .............. 362/510
5,634,704 A * 6/1997 Shikama et al. ............ 362/552
6,623,145 B2 * 9/2003 Ishihara ...................... 362/346

FOREIGN PATENT DOCUMENTS

JP 2001-110217 A 4/2001

* cited by examiner

Primary Examiner—Sandra O'Shea
Assistant Examiner—Bao Q. Truong
(74) Attorney, Agent, or Firm—Frishauf, Holtz, Goodman & Chick, P.C.

(57) ABSTRACT

A light source unit is provided which includes a lamp and a reflector for reflecting rays of light emitted by a light emitting element of the lamp and for focusing the reflected rays of light. In order to focus on a predetermined focal point the rays of light emitted by the light emitting element of the lamp and refracted by a cross-sectional shape of the lamp, the reflector has a concave reflective shape formed so as to satisfy a predetermined calculation expression. Alternatively, a reflective surface shape of the reflector may be obtained by shifting portions of an ellipse and rotating a curve of the shifted portions around the optical axis of the light source unit.

9 Claims, 7 Drawing Sheets

LIGHT SOURCE UNIT AND PROJECTOR TYPE DISPLAY DEVICE USING THE LIGHT SOURCE UNIT

BACKGROUND OF THE INVENTION

1. Field of the Invention

The present invention relates to a light source unit for use in a display device such as a projector, and a display device using such light source unit.

2. Description of the Related Art

Rays of light emitted from a light emitting element of a lamp valve of a light source unit for use in a display device such as a projector are focused on an incident plane of a glass or plastic rod (or light tunnel of a hollow cylinder with an internal reflective surface) by a reflector having a light reflecting function on a front or back surface thereof.

Often used as one of the shapes of the reflective surfaces of the reflectors is a concave surface coinciding with an outer surface of one of two halves into which a spheroid is bisected along its plane perpendicular to its axis coinciding with an optical axis. In this case, it is intended that the reflector is disposed such that first and second focuses of the spheroid align on the optical axis, and the light emitting element of the lamp and the center of the incident plane of the rod are disposed at the first and second foccal points, respectively, of the spheroid to securely focus the rays of light emitted by the light emitting element onto an end of the rod to thereby cause the rays of light to enter the rod.

A cross-sectional shape of the lamp valve obtained when the lamp valve is cut along a plane containing the optical axis does not provide a concentric shape whose center coincides with the light emitting element of the lamp.

Therefore, rays of light emitted from the light emitting element are refracted when they pass through the lamp valve (for example, the lamp valve having enclosed the light emitting element therein acts as a convex lens to thereby refract the rays of light).

Even when the respective rays of light emitted from the outer surface of the lamp valve are extended toward the light emitting element, a virtual image of the light emitting element deviates generally from the optical axis.

Therefore, the respective rays of light emitted from the light emitting element of the lamp disposed at the position in the reflector coinciding with the first focal point, passing through the lamp valve and refracted by the refractor are not completely focused on the position coinciding with the second focal point. Thus, the problem with the light source unit is that part of the rays of light from the lamp does not enter the rod and the percentage of using the rays of light from the lamp is low.

SUMMARY OF THE INVENTION

According to a first aspect of the present invention, there is provided a light source unit comprising:

a lamp; and a reflector for reflecting rays of light emitted by the lamp, the lamp comprising a light emitting element very small in size compared to the reflector, and a lamp valve having enclosed the light emitting element, the reflector having a reflective surface formed so as to focus on a predetermined focal point the rays of light emitted by the light emitting element and refracted by a cross-sectional shape of the lamp valve, the reflective surface having a cross-sectional shape $(x_3, y_3(=f(x_3)))$ containing an optical axis and determined such that when a point $(x_2, y_2)$ on an outer surface of the lamp valve is calculated through which the ray of light emitted from a position $(s, 0)$ of the light emitting element and refracted at a point $(x_1, y_1)$ on an inner surface of the lamp valve passes, and a point $(x_3, y_3 (=f(x_3)))$ on the reflective surface is calculated where the ray of light refracted at the point $(x_2, y_2)$ intersects with the reflector, and these calculations are further carried by changing $(x_1, y_1)$ little by little, the following expression (1) takes a substantially constant value C $$\sqrt{(I-x_3)^2+f(x_3)^2}+\sqrt{(x_3-x_2)^2+(f(x_3)-y_2)^2}+ \qquad (1)$$
$$n\cdot\sqrt{(x_2-x_1)^2+(y_2-y_1)^2}+\sqrt{(x_1-s)^2+y_1^2}=C$$

where $(I, 0)$ is the position of the focal point.

A second aspect of the present invention, there is also provided a display apparatus comprising:

a light source unit that comprises:

a lamp; and a reflector for reflecting rays of light emitted by the lamp, the lamp comprising a light emitting element very small in size compared to the reflector, and a lamp valve having enclosed the light emitting element, the reflector having a reflective surface formed so as to focus to a predetermined focal point the rays of light emitted by the light emitting element and refracted by a cross-sectional shape of the lamp valve, the reflective surface having a cross-sectional shape $(x_3, y_3(=f(x_3)))$ containing an optical axis and determined such that when a point $(x_2, y_2)$ on an outer surface of the lamp valve is calculated through which the ray of light emitted from a position $(s, 0)$ of the light emitting element and refracted at a point $(x_1, y_1)$ on an inner surface of the lamp valve passes, and a point $(x_3, y_3(=f(x_3)))$ on the reflective surface is calculated where the ray of light refracted at the point $(x_2, y_2)$ intersects with the reflective surface, and these calculations are further carried by changing $(x_1, y_1)$ little by little, the following expression (1) takes a substantially constant value C $$\sqrt{(I-x_3)^2+f(x_3)^2}+\sqrt{(x_3-x_2)^2+(f(x_3)-y_2)^2}+ \qquad (1)$$
$$n\cdot\sqrt{(x_2-x_1)^2+(y_2-y_1)^2}+\sqrt{(x_1-s)^2+y_1^2}=C$$

where $(I, 0)$ is the position of the focal point; and a display projector unit that comprises:

an illumination adjuster for receiving at the focal point the rays of light emitted by the light source unit, for adjusting the illumination of the received rays of light, and for allowing the adjusted rays of light to pass therethrough;.

a relay lens system for guiding to a light-transparent chart the rays of light having passed through the illumination adjuster; and a projection lens system for projecting the rays of light having passed the chart onto a screen.

According to a third aspect of the present invention, there is also provided a light source unit comprising:

a lamp; and a reflector for reflecting rays of light emitted by the lamp;

the lamp comprising a light emitting element very small in size compared to the reflector and a valve that has enclosed the light emitting element;

the reflector having a concave reflective surface shape obtained by shifting toward an optical axis passing through two focal points of an ellipse wherein the two focal points coincide respectively with the position of the light emitting element and a predetermined light focusing point, a portion of the ellipse extending from a boundary point on the ellipse to a positive direction of the optical axis, and shifting away from the optical axis a portion of the ellipse extending from the boundary point to the direction of the optical axis opposite to its positive direction, and then rotating a curve of those shifted ellipse portions around the optical axis, wherein the boundary point is a point on the ellipse on which among the rays of light emitted by the light emitting element and having passed through the lamp valve, a ray of light whose extension extending toward the lamp valve passes through the light emitting element hits, and the positive direction of the optical axis is from the position of the light emitting element toward the predetermined light focusing point.

According to a fourth aspect of the present invention, there is also provided a light source unit comprising:
 a lamp; and
 a reflector for reflecting rays of light emitted by the lamp;
 the lamp comprising a light emitting element very small in size compared to the reflector and a valve that has enclosed the light emitting element;
 the reflector having a concave reflective surface shape obtained by shifting away from an optical axis passing through two focal points of an ellipse wherein the two focal points coincide respectively with the position of the light emitting element and a predetermined light focusing point, a portion of the ellipse extending from a boundary point on the ellipse to a positive direction of the optical axis, and shifting toward the optical axis a portion of the ellipse extending from the boundary point to the direction of the optical axis opposite to its positive direction, and then rotating a curve of those shifted ellipse portions around the optical axis, wherein the boundary point is a point on the ellipse on which among the rays of light emitted by the light emitting element and having passed through the lamp valve, a ray of light whose extension extending toward the lamp valve passes through the light emitting element hits, and the positive direction of the optical axis is from the position of the light emitting element toward the predetermined light focusing point.

According to a fifth aspect of the present invention, there is also provided a display device comprising:
 a light source unit that comprises:
  a lamp; and
  a reflector for reflecting rays of light emitted by the lamp;
  the lamp comprising a light emitting element very small in size compared to the reflector and a valve that has enclosed the light emitting element;
  the reflector having a reflective surface shape obtained by shifting toward an optical axis passing through two focal points of an ellipse wherein the two focal points coincide respectively with the position of the light emitting element and a desired light focusing point, a portion of the ellipse extending from a boundary point on the ellipse to a positive direction of the optical axis, and shifting away from the optical axis a portion of the ellipse extending from the boundary point to the direction of the optical axis opposite to its positive direction, and then rotating a curve of those shifted ellipse portions around the optical axis, wherein the boundary point is a point on the ellipse on which among the rays of light emitted by the light emitting element and having passed through the lamp valve, a ray of light whose extension extending toward the lamp valve passes through the light emitting element hits, and the positive direction of the optical axis is from the position of the light emitting element to the light focusing point; and
 a display projector unit that comprises:
  an illumination adjuster for receiving at the focal point the rays of light emitted by the light source unit, for adjusting the illumination of the received rays of light, and for allowing the adjusted rays of light to pass therethrough;.
  a relay lens system for guiding to a light-transparent chart the rays of light having passed through the illumination adjuster; and
  a projection lens system for projecting the rays of light having passed the chart onto a screen.

According to a sixth aspect of the present invention, there is also provided a display device comprising:
 a light source unit comprising:
  a lamp; and
  a reflector for reflecting rays of light emitted by the lamp; the lamp comprising a light emitting element very small in size compared to the reflector and a valve that has enclosed the light emitting element;
  the reflector having a concave reflective surface shape obtained by shifting way from an optical axis passing through two focal points of an ellipse wherein the two focal points coincide respectively with the position of the light emitting element and a desired light focusing point, a portion of the ellipse extending from a boundary point on the ellipse to a positive direction of the optical axis, or shifting toward the optical axis a portion of the ellipse extending from the boundary
 point to the direction of the optical axis opposite to its positive direction, and then rotating a curve of those shifted ellipse portions around the optical axis, wherein the boundary point is a point on the ellipse on which among the rays of light emitted by the light emitting element and having passed through the lamp valve, a ray of light whose extension extending toward the lamp valve passes through the light emitting element hits, and the positive direction of the optical axis is from the position of the light emitting element to the light focusing point; and
 a display projector unit that comprises:
  an illumination adjuster for receiving at the focal point the rays of light emitted by the light source unit, for adjusting the illumination of the received rays of light, and for allowing the adjusted rays of light to pass therethrough;.
  a relay lens system for guiding to a light-transparent chart the rays of light having passed through the illumination adjuster; and
  a projection lens system for projecting the rays of light having passed the chart onto a screen.

According to a seventh aspect of the present invention, there is also provided a light source unit comprising:
 a lamp; and
 a reflector for reflecting rays of light emitted by the lamp, the lamp comprising a light emitting element very small in size compared to the reflector, and a lamp valve having enclosed the light emitting element,
 the reflector having a concave reflective surface obtained by rotating around an optical axis passing through two focal points of an ellipse wherein the two focal points coincide respectively with the position of the light emitting element and a predetermined light focusing point, a curve composed of two curve portions with a boundary point between the two curve portions, one of the curve portions extending from the boundary point toward a positive direction of the optical axis and having a curvature smaller than the corresponding one of the ellipse, and the other curve portion extending from the boundary point toward the direction of the optical axis opposite to its positive direction and having a curvature larger than the corresponding one of the ellipse, the boundary point being shared by the curve and the ellipse, wherein the boundary point is a point on the curve on which among the rays of light emitted by the light emitting element and having passed through the lamp valve, a ray of light whose extension extending toward the lamp valve passes through the light emitting element hits, and the positive direction of the optical axis is from the position of the light emitting element to the light focusing point.

DESCRIPTION OF THE PREFERRED EMBODIMENTS (First Embodiment)

A first embodiment of a light source unit and a display device of the present invention will be described with reference to the accompanying drawings.

Figure 1:
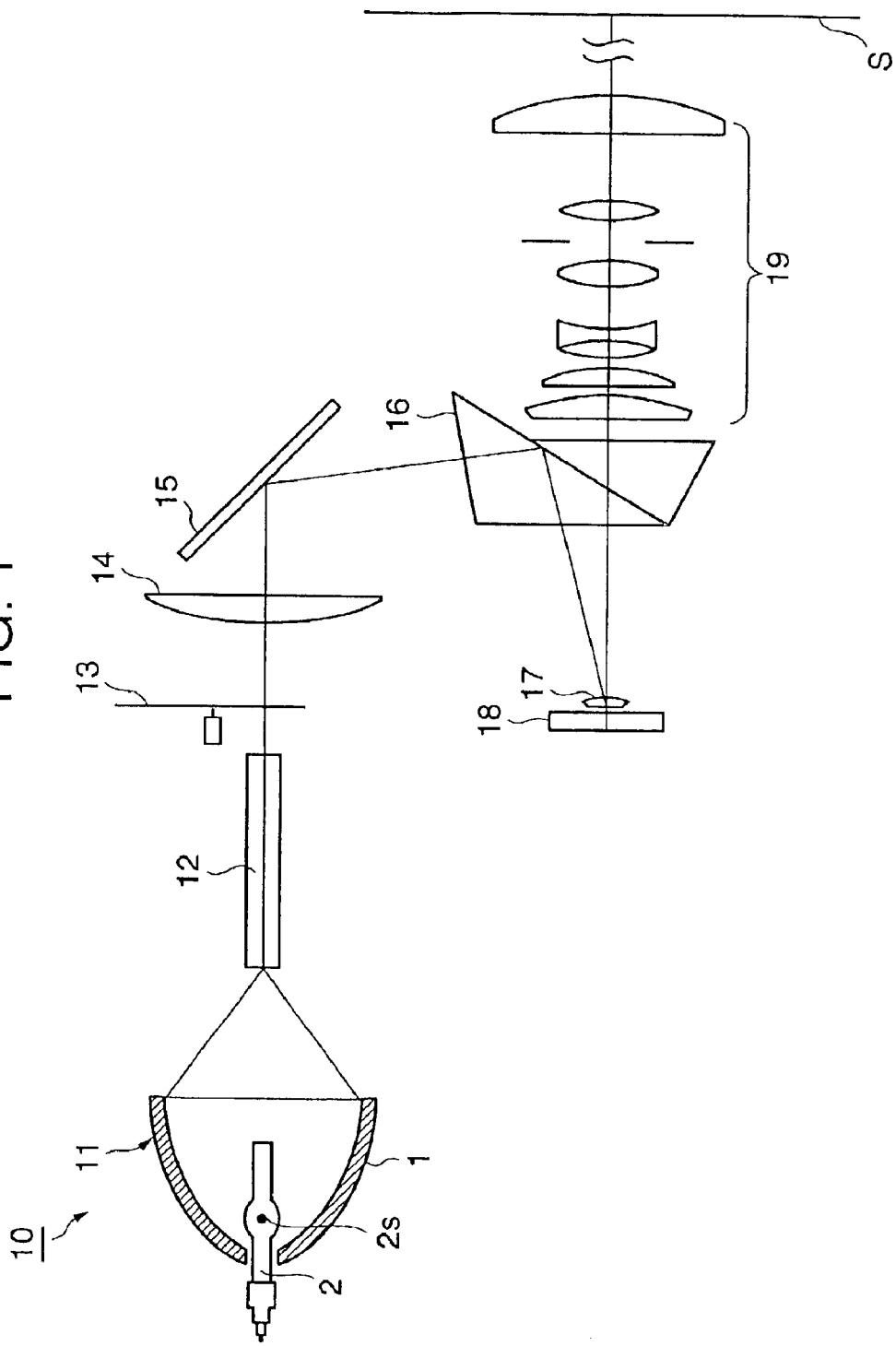
FIG. 1 illustrates one example of a display device using a light source unit as a first embodiment of the present invention.
Figure 2:
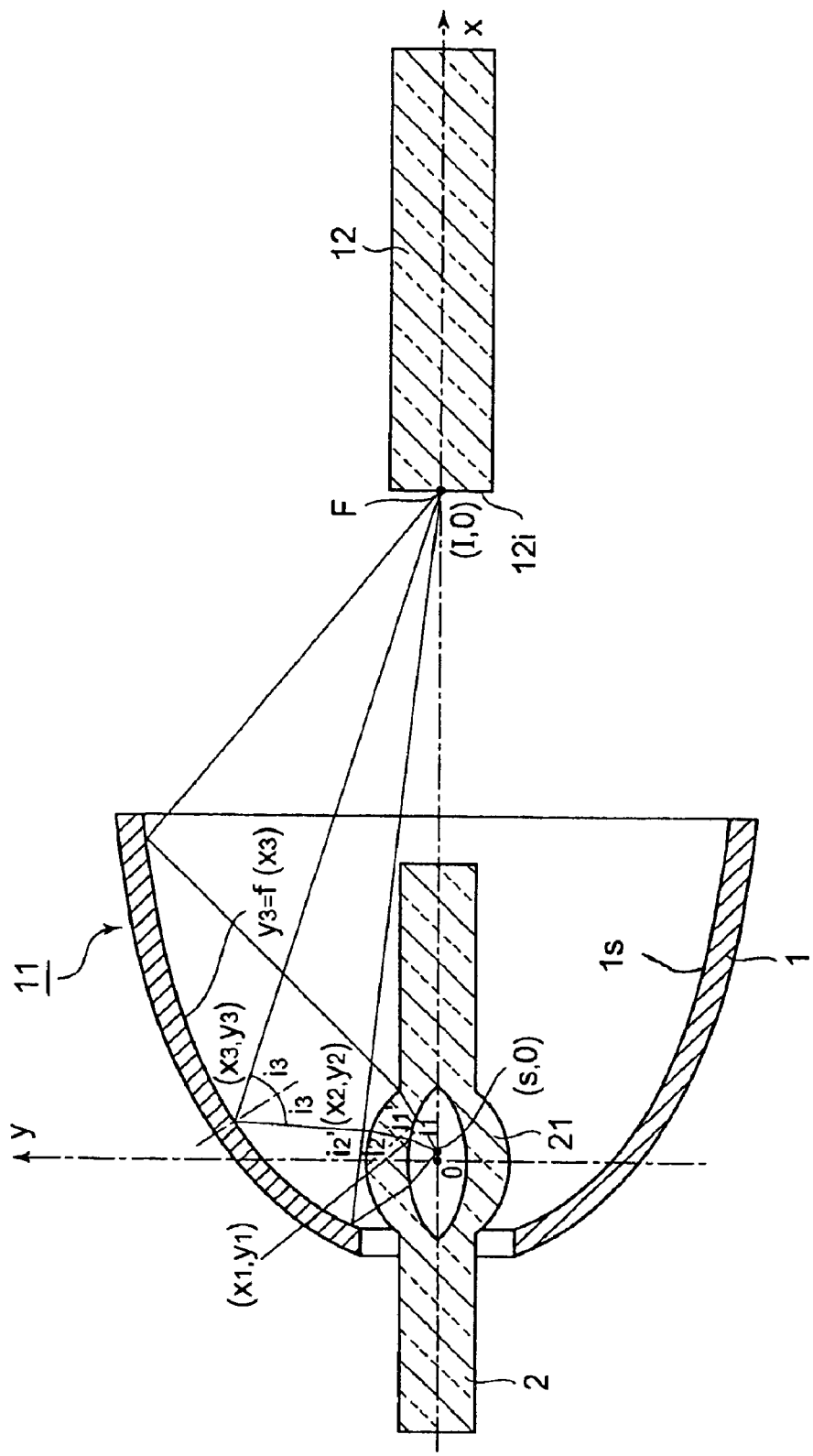
FIG. 2 is a cross-sectional view of one example of the light source unit of the first embodiment.

The light source unit and the display device of this embodiment are applied to a data projector using a DMD (Digital Micromirror Device). FIG. 1 schematically illustrates the data projector device 10. FIG. 2 shows a cross-sectional view of the light source unit 11 and a glass rod (illumination adjuster) 12 optically coupled to the light source, used in the data projector 10.

As shown in FIG. 2, the light source unit 11 includes a lamp 2, and a reflector 1 that reflects rays of light emitted from a light emitting element 2s of the lamp 2 and causes the reflected rays of light to be focused on a point F on an incident plane 12i of the glass rod 12.

The lamp 2 includes a high-pressure mercury lamp whose arc length is on the order of several millimeters. The light emitting element 2s is very small in size compared to the reflector 1. A lamp valve 21 having enclosed the light emitting element 2s is made of glass and has inner and outer surface shapes shown in FIG. 3. Thus, the lamp valve 21 acts as a convex lens on the rays of light emitted from the light emitting element 2s of the lamp 1.

The light emitting element 2s of the lamp 2 deviates along the axis of the lamp from the center O of the enclosing part of the lamp valve 21 due to the position of electrodes (not shown) that are provided to produce an arc.

The reflector 1 has a shape capable of focusing on a predetermined focal point F the rays of light emitted from the light emitting element of the lamp 1 and refracted when the rays of light pass through the lamp valve 21.

One example of determining the shape of the reflector 1 will be described next.

The lamp valve 21 has inner and outer surfaces whose cross-sectional shapes are formed by parts of two different ellipses, and includes a body of revolution obtained by revolving the parts of different ellipses around an optical axis x deviating parallel to the axes of the ellipses.

Figure 3:
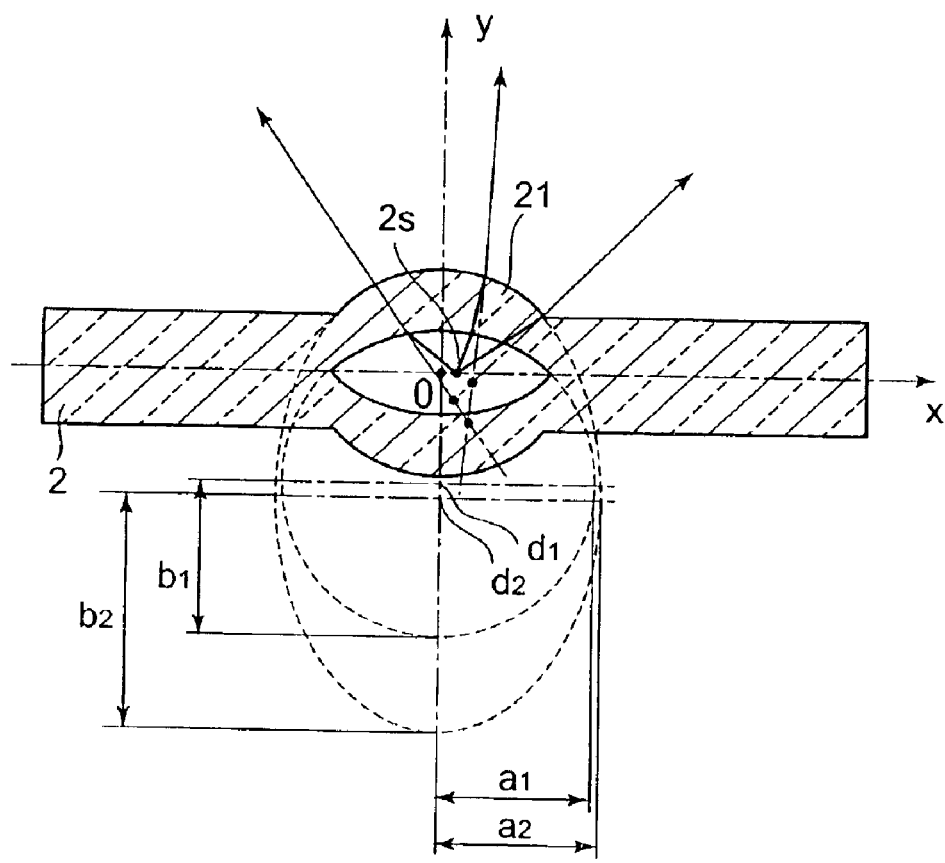
FIG. 3 is a cross-sectional view of one example of a lamp of the optical source unit of the first embodiment.

As shown in FIGS. 2 and 3, let the optical axis and a vertical axis of the ellipse perpendicular to the optical axis and passing through the center O (i.e., the origin) of the lamp valve 21 be x and y axes, respectively.

Similarly, let the $x^{31}$ and $y^{31}$ axial diameters of the ellipse composing the cross-section of the internal surface of the lamp valve 21 be $2a_1$ and $2b_1$, respectively, and also let the center point be $(0, d_1)$. Likewise, let the $x^{31}$ and $y^{31}$ axial diameters of the ellipse composing the cross-section of the outer surface of the lamp valve 21 be $2a_2$ and $2b_2$, respectively, and also let the center point be $(0, d_2)$. Also, let the refractive index of glass composing the lamp valve 21 be n. Also, let the brightest point on the light emitting element 2s of the lamp 2 be a brightness point (s,0).

As shown in FIG. 2, the rays of light emitted from the brightness point (s, 0) pass toward a point $(x_1, y_1)$ satisfying the following expression on the internal surface of the lamp valve 21:

$$(x_1/a_1)^2 + \{(y_1-d_1)/b_1\}^2 = 1 \tag{2}$$

The rays of light are refracted at this point $(x_1, y_1)$. Let the incident and refractive angles be $i_1$ and $i_1'$, respectively. Then, $$\sin i_1 = n \sin i_1' \tag{3}$$

A tangent at each point on an ellipse having the shape $$(x/a)^2 + \{(y-d)/b\}^2 = 1 \tag{4}$$

is given by $$dy/dx = -(b/a)^2 \cdot \{x/(y-d)\} \tag{5}$$

Therefore, in FIG. 2 the incident angle $i_1$ is represented as $$i_1 = \tan^{-1}\{y_1/(x_1-s)\} - \tan^{-1}\lfloor (b_1/a_1)^2 \cdot \{x_1/(y_1-d_1)\}\rfloor \tag{6}$$

Then, by substituting the coordinates of each of points $(x_1, y_1)$ on the internal surface of the lamp valve shown in equation (1) into equation (5), the incident angle $i_1$ is calculated. From equation (2), a refractive angle $i_1'$ is obtained as $$i_1' = \tan^{-1}\{(y_2-y)/(x_2-x_1)\} - \tan^{-1}\lfloor (b_1, /a_1)^2 \cdot \{x_1/(y_1-d_1)\}\rfloor \tag{7}$$

As shown in FIG. 2, the ray of light having passed through the lamp valve 21 at each point $(x_1, y_1)$ on the inner surface of the lamp valve passes to a corresponding point $(x_2, y_2)$ on the outer surface of the lamp valve 21 satisfying an expression $$(x_2/a_2)^2 + \{(y_2-d_2)/b_2\}^2 = 1 \tag{8}$$

The ray of light is again refracted at this point $(x_2, y_2)$ to go out from the lamp valve 21. Let the incident and reflective angles be $i_2$ and $i_2'$, respectively. Then $$n \sin i_2 = \sin i_2' \tag{9}$$

From FIG. 2, the incident angle $i_2$ is given by $$i_2 = \tan^{-1}\{(y_2-y_1)/(x_2-x_1)\} - \tan^{-1}\lfloor (b_2/a_2)^2 \cdot \{x_2/(y_2-d_2)\}\rfloor \tag{10}$$

Substituting the coordinates of each of the points $(x_2, y_2)$ on the outer surface of the lamp valve shown in equation (8) into equation (10), the incident angle $i_2$ is calculated. The reflective angle $i_2'$ is calculated from equation (9) as $$i_2' = \tan^{-1}\{(y_3-y_2)/(x_3-x_2)\} - \tan^{-1}\lfloor (b_2/a_2)^2 \cdot \{x_2/(y_2-d_2)\}\rfloor \tag{11}$$

As shown in FIG. 2, the ray of light having passed through each of the points $(x_2, y_2)$ on the outer surface of the lamp valve is refracted at a respective one of points $(x_3, y_3)$ on a reflective surface of the reflector 1. In order that these reflected rays of light are focused on a point on the optical axis, the following expression representing the shape of the reflective surface is of the reflector 1 is determined:

$$y_3 = f(x_3) \quad (12)$$

Each of the inter and outer surfaces of the lamp valve 21 and the reflective surface is of the reflector 1 comprises a continuous surface. Therefore, if the rays of light emitted from the brightness point (s, 0) are focused on a point F (I, 0) on the optical axis, a law that the optical path lengths are constant holds about the paths of the rays of light. That is, $$\sqrt{(I-x_3)^2 + f(x_3)^2} + \sqrt{(x_3-x_2)^2 + (f(x_3)-y_2)^2} + \\ n \cdot \sqrt{(x_2-x_1)^2 + (y_2-y_1)^2} + \sqrt{(x_1-s)^2 + y_2^2} = C \quad (1)$$

where C is a constant.

Substituting the respective variables $x_1$–$x_3$ and $y_1$–$y_3$ into expression (1), the constant C is calculated.

$X_1$ and $y_1$ are changed little by little to thereby obtain, $x_2$, $y_2$, $i_2$' on each of the rays of light, and corresponding $(x_3, F(x_3))$ is calculated from equations (10), (11) and (1). Thus, a cross-sectional shape of the reflector 1 is determined.

If a concave surface coinciding with an outer surface of one of two halves into which a body of revolution obtained by revolving the cross-sectional shape around the optical axis x is bisected along its vertical center plane is the shape of the reflective surface 1s of the reflector 1, an illumination unit 11 is provided in which the rays of light emitted from the brightness point (s, 0) are focused on the point (I, 0) on the optical axis.

The rays of light emitted from the illumination unit 11 are focused on the single point on the optical axis, as just described above, where the rays of light enter the glass rod 12. Then, the rays of light pass through a rotating RGB filter (color wheel) 13 into a condenser lens 17 by a relay lens system (including relay lens 14, reflective mirror 15, reflective prism 16) to thereby illumine DMD 18.

The reflective rays of light from DMD 18 are amplified by a projector lens system 19 and then projected onto a screen S.

According to the light source unit of this embodiment, the shape of the refractive surface 1s of the reflector 1 is determined in consideration of reflection of rays of light by the lamp valve 21, and the reflected rays of light from the reflector 1 are securely focused on the single point on the optical axis. Therefore, a larger number of rays of light emitted from the lamp 2 can be used to illumine an object of illumination (incident plane 12i of the glass rod 12).

Thus, the size of the incident plane 12i of the glass rod 12 as an object of illumination can be reduced. If the cross-sectional area of the glass rod is reduced, the projective angle magnification is reduced to thereby increase the parallel degree of the rays of light hitting on a chart, for example, of the DMD. Thus, the aperture of the projection lens system 19 of the projector 10 can be reduced.

(Second Embodiment)

A second embodiment of the light source unit and display device of the present invention will be described next with reference to the accompanying drawings.

Figure 4:
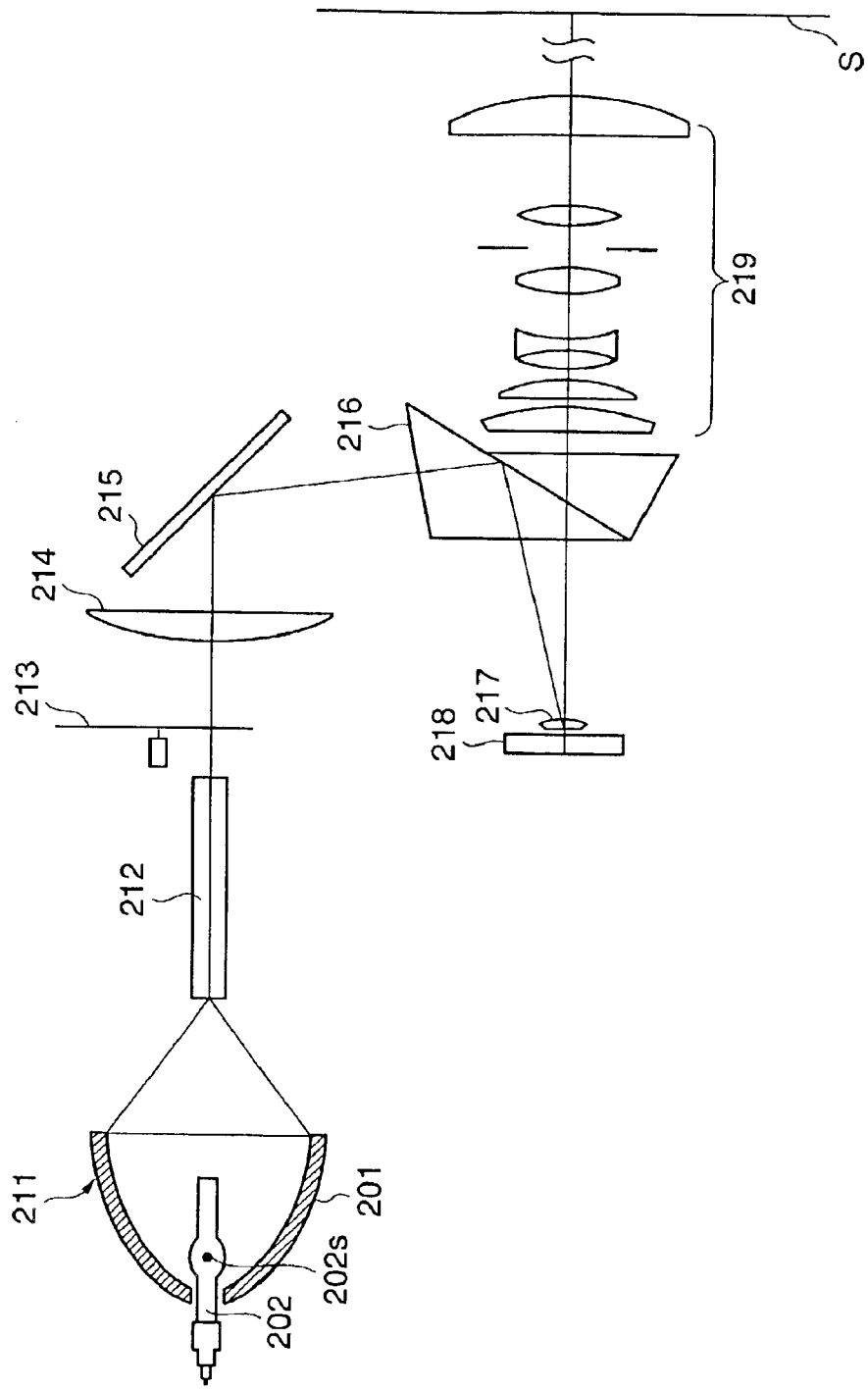
FIG. 4 schematically illustrates one example of a display device using a light source unit as a second embodiment of the present invention.
Figure 5:
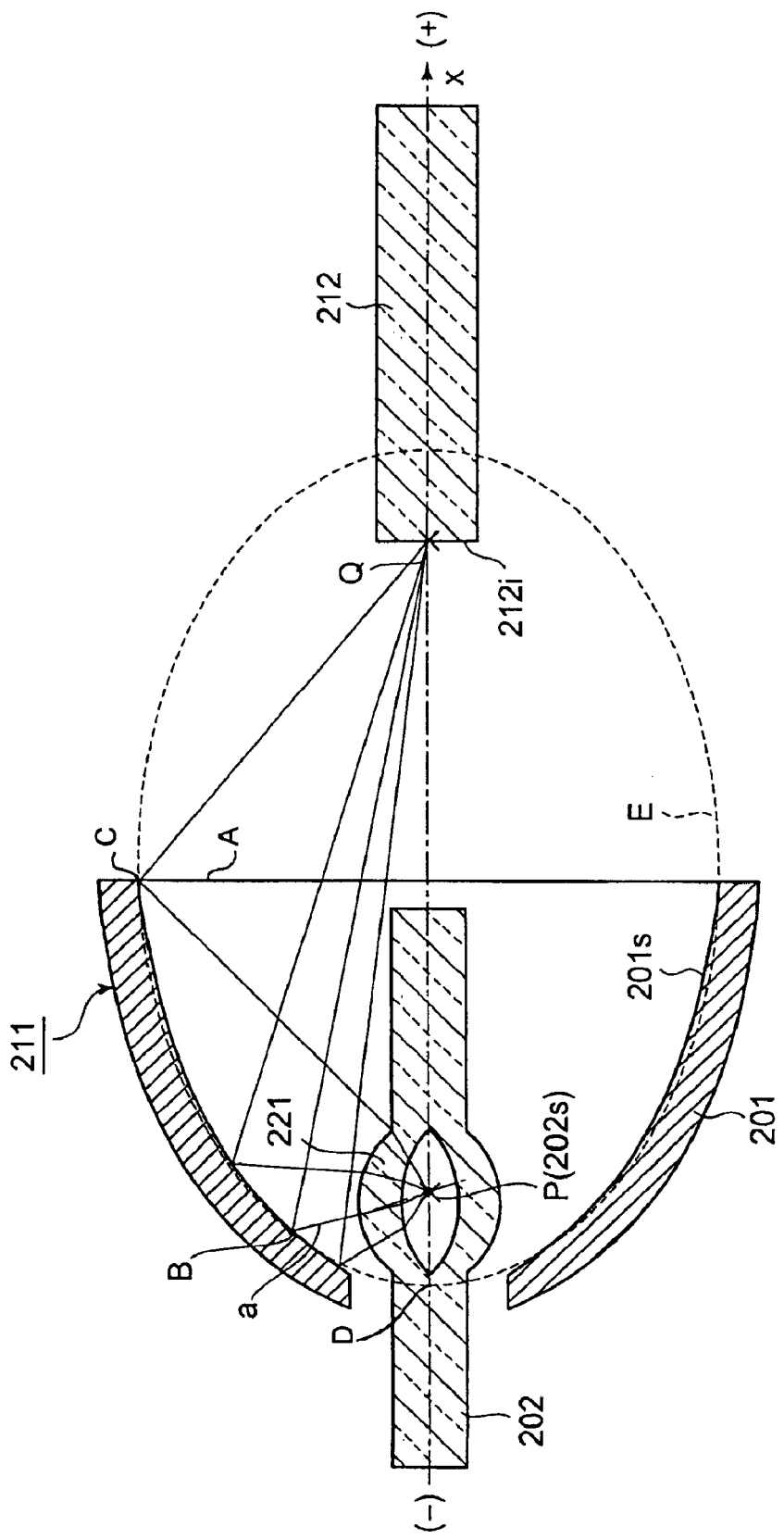
FIG. 5 is a cross-sectional view of one example of the light source unit of the second embodiment.

The light source unit and display device of this embodiment are applied to a data projector using a DMD (Digital Micromirror Device). FIG. 4 schematically illustrates the data projector 210. FIG. 5 is a cross-sectional view of the light source unit 211 and a glass rod 212 (illumination adjustor) optically coupled to the light source unit used in the data projector 210.

As shown in FIG. 5, the light source unit 211 of this embodiment includes a lamp 202, and a reflector 201 that reflects rays of light emitted from a light emitting element 202s of the lamp 202 and that focuses the reflected rays of light on a point (focusing point) Q on an incident plane 212i of the glass rod 212.

The lamp 202 includes a high-pressure mercury lamp whose arc length is on the order of several millimeters with the light emitting element 202s being very small in size compared to the reflector 201. The lamp valve 212 that has enclosed the light emitting element of the lamp 202 therein is made of glass. The lamp valve 221 has inner and outer surface shapes shown in FIG. 6. Therefore, the lamp valve 221 acts as a convex lens on the rays of light emitted from the light emitting element 202s of the lamp 201.

The light emitting element 202s of the lamp 202 deviates somewhat along the axis of the lamp from the center of its part that has enclosed the light emitting element due to the position of electrodes (not shown) that are provided to produce an arc.

Figure 6:
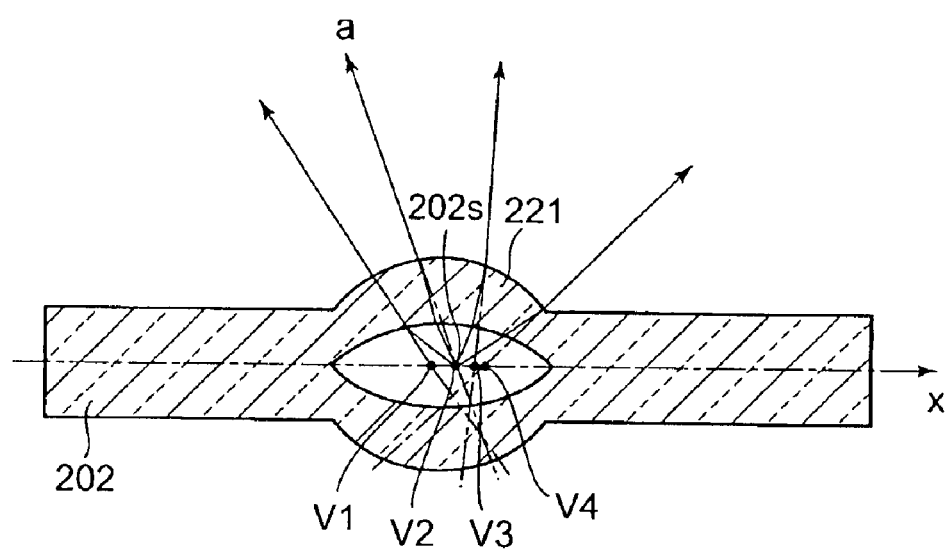
FIG. 6 is a cross-sectional view of one example of a lamp of the light source unit of the second embodiment.

As shown in FIG. 6, when the rays of light pass through the lamp valve 221 from the light emitting element 202s of the lamp 201, the respective rays of light are refracted and emitted from the outer surface of the lamp valve 221. When the respective rays of light emitted from the outer surface of the lamp valve 221 are extended toward the light emitting element 202s, the points V1, V2, V3, . . . where the extensions of rays of light intersect with the optical axis x (or a line connecting the light emitting element 202s and the focusing point Q) are dispersed along the optical axis x.

Among the extensions of rays of light emitted from the outer surface of the lamp valve 221 toward the light emitting element 202s, one ray of light passing through the light emitting element 202s is handled as a reference ray of light a.

As shown in FIG. 5, a boundary point is defined as a point B where the reference ray of light a intersects with an ellipse E whose focal points coincide respectively with the positions of the light emitting element 202s at P and light focusing point Q. The positive direction of the optical axis x is defined as a direction from the light emitting element 202s toward the light focusing point Q, and the negative direction of the optical axis x is defined as the direction opposite to the positive direction of the optical axis x.

The reflective surface shape of the reflector 201 is formed so as to have a concave surface complementary to an outer surface of a body of revolution obtained by by shifting somewhat as shown by a solid line toward the optical axis x a portion of the ellipse E (shown by a broken line) extending from the boundary point B to a point C where it intersects with a vertical center line A of the ellipse E in the positive direction of the optical axis x (shown by (+) in FIG. 5), also shifting away as shown by a solid line from the optical axis x a portion of the ellipse E (shown by a broken line) extending from the boundary point B to an end point D of this portion the ellipse E in the negative direction of the optical axis x (shown by (−) in FIG. 5), and then revolving a curve of those shifted portions around the optical axis x.

The shifted quantities of the ellipse portions are such that rays of light reflected at the respective points on the reflective surface 201s of the reflector 1 are focused on the optical focusing point Q.

In other words, the reflective surface of the reflector 201 is formed so as to have have a concave surface shape coinciding with an inner surface of a body of revolution obtained by revolving around the optical axis x a curve composed of the portion of the curve extending from the boundary point B to the intersection C in the positive direction of the optical axis x and having a curvature smaller than that of the corresponding portion of the ellipse E and the portion of the curve extending from the boundary point B to the end point D in the negative direction of the optical axis x and having a curvature larger than that of the corresponding portion of the ellipse E. By such reflective surface shape, the rays of light emitted by the light emitting element are focused on the optical focusing point Q.

The rays of light emitted by the illumination unit 211 are focused on a point on the optical axis, where they enter the glass rod 212. Then, as shown in FIG. 4, the rays of light pass through a RGB filter 213 and then a relay lens system (including a relay lens 214, a reflective mirror 215, and a reflective prism 216) into a condenser lens 217 thereby illumine the DMD 218. The rays of light reflected by the DMD 218 are amplified and projected by a projector lens system 219 onto a screen S.

According to the light source unit 211 and the data projector 210 of this embodiment, the shape of the reflective surface 201s of the reflector 201 is determined in consideration of refraction of the rays of light by the lamp valve 221 to ensure that the rays of light reflected by the reflector 201 are focused on a point on the optical axis x. Therefore, more rays of light emitted by the lamp 202 can be used to illuminate the focusing point Q on the incidence plane 212i of the glass rod 212.

Thus, the size of the incident plane 212i of the glass rod 212 as an object of illumination can be reduced. As the cross-sectional area of the glass rod 212 is reduced, the projection angle magnification is reduced to thereby increase a parallel degree of the rays of light hitting on the DMD 218. Thus, the aperture of the projector lens system 219 of the data projector 210 is reduced.

Figure 7:
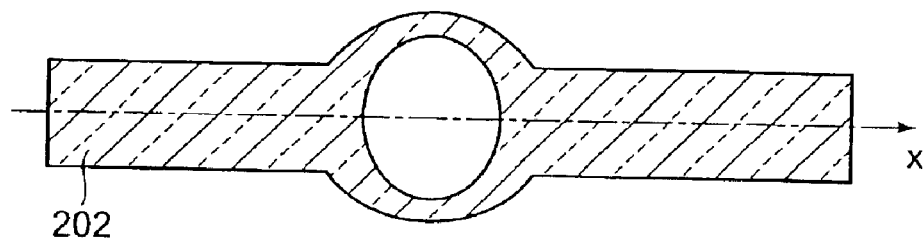
FIG. 7 is a cross-sectional view of another example of the lamp of the light source unit of the second embodiment.

In the particular embodiment, the cross-section of the lamp valve 221 is illustrated as taking the form of a convex lens. In contrast, as shown in FIG. 7 if the cross-section of the lamp valve takes the form of a concave lens, the reflective surface of the reflector 201 is formed so as to have a concave surface coinciding with an inner surface of a body of revolution obtained by shifting away from the optical axis x a portion of the ellipse E extending from the boundary point B to the positive direction of the optical axis x (shown by (+) in FIG. 5), also shifting toward the optical axis x a portion of the ellipse E extending from the boundary point B to the negative direction of the optical axis x (shown by (−) in FIG. 5), and then revolving a curve of those shifted ellipse portions around the optical axis x.

In other words, the reflector 201 has a concave reflective surface shape coinciding with an inner surface of a body of revolution obtained by revolving around the optical axis x a curve composed of a curve portion extending from the boundary point B to the positive direction of the optical axis x and having a curvature larger than that of the corresponding portion of the ellipse E and a curve portion extending from the boundary point B to the negative direction of the optical axis x and having a curvature smaller than that of the corresponding portion of the ellipse E.

While in the particular embodiment the portions of the ellipse E present on both sides of the boundary point B on the ellipse E are shifted toward and away from the optical axis, a target on which the rays of light are focused by the reflector is not necessarily the single point Q actually. The rays of light may be focused within a light focusing surface 212i having an area. Therefore, a boundary portion of a predetermined length containing the boundary point B on the ellipse E may be determined depending upon the area of the light focusing surface 212i. The portion of the ellipse E may be shifted toward or away from the optical axis depending upon the boundary portion such that the shape of the reflector can be set with a certain degree of freedom. At this time, the length of the boundary portion is set such that among the rays of light emitted through the lamp valve by the light emitting element and reflected by the boundary portion, the rays of light reflected by the boundary portion can arrive at the light focusing surface 212i.

While in the respective embodiments the data projector 10 using the DMD are illustrated as the display device, the present invention is not limited to this particular case. For example, the present invention may be applicable to the light sources of various display devices such as OHPs (Overhead Projectors) and film projectors.

The inventive light source unit is generally applicable to devices that focus the rays of light emitted from a lamp on a single point in use.

Of course, the specified details of the embodiments may be modified on demand.

What is claimed is:

1. A light source unit comprising:
   a lamp comprising a light emitting element and a lamp valve enclosing the light emitting element; and
   a reflector having a reflective surface for reflecting rays of light emitted by the lamp and refracted by the lamp valve so as to focus the rays of light on a predetermined focal point;
   wherein the reflector is larger than the light emitting element, and the reflective surface has a cross-sectional shape containing an optical axis and determined such that the following expression (1) takes a substantially constant value C when: (i) a point $(x_2, y_2)$ on an outer surface of the lamp valve is calculated through which a ray of light emitted from a position $(s, 0)$ of the light emitting element and refracted at a point $(x_1, y_1)$ on an inner surface of the lamp valve passes, (ii) a point $(x_3, y_3 (=f(x_3)))$ on the reflective surface of the reflector is calculated where the ray of light refracted at the point (x2, y2) intersects with the reflector, and (iii) said calculations are carried out by changing (x1, y1) little by little:

$$\sqrt{(I-x_3)^2 + f(x_3)^2} + \sqrt{(x_3-x_2)^2 + (f(x_3)-y_2)^2} + \qquad (1)$$
$$n \cdot \sqrt{(x_2-x_1)^2 + (y_2-y_1)^2} + \sqrt{(x_1-s)^2 + y_2^2} = C$$

where $(I, 0)$ is a position of the focal point, and n is a refractive index of the lamp valve.

2. A display apparatus comprising:
   (a) a light source unit which comprises:
   a lamp comprising a light emitting element and a lamp valve enclosing the light emitting element; and
   a reflector having a reflective surface for reflecting rays of light emitted by the lamp and refracted by the lamp valve so as to focus the rays of light on a predetermined focal point;
   wherein the reflector is larger than the light emitting element, and the reflective surface has a cross-sectional shape containing an optical axis and determined such that the following expression (1) takes a substantially constant value C when: (i) a point $(x_2, y_2)$ on an outer surface of the lamp valve is calculated through which a ray of light emitted from a position $(s, 0)$ of the light emitting element and refracted at a point $(x_1, y_1)$ on an inner surface of the lamp valve passes, (ii) a point $(x_3, y_3 (=f(x_3)))$ on the reflective surface of the reflector is calculated where the ray of light refracted at the point (x2, y2) intersects with the reflector, and (iii) said calculations are carried out by changing (x1, y1) little by little:

$$\sqrt{(I-x_3)^2 + f(x_3)^2} + \sqrt{(x_3-x_2)^2 + (f(x_3)-y_2)^2} + \\ n \cdot \sqrt{(x_2-x_1)^2 + (y_2-y_1)^2} + \sqrt{(x_1-s)^2 + y_2^2} = C \quad (1)$$

where (I, 0) is a position of the focal point, and n is a refractive index of the lamp valve; and (b) a display projector unit which comprises:
an illumination adjuster for receiving at the focal point the rays of light emitted by the light source unit, adjusting an illumination of the received rays of light, and passing the adjusted rays of light therethrough;
a relay lens system for guiding the rays of light from the illumination adjuster to a light-transparent chart; and
a projection lens system for projecting the rays of light from the light-transparent chart onto a screen.

3. A light source unit comprising:
a lamp comprising a light emitting element and a lamp valve enclosing the light emitting element; and
a reflector having a concave reflecting surface for reflecting rays of light emitted by the lamp so as to focus the rays on a predetermined focus point, said reflector being larger than the light emitting element;
wherein a position of the light emitting element and the predetermined focus point define two focal points of an ellipse, and an optical axis passes through the two focal points;
wherein the reflective surface has a shape defined by shifting a first portion of the ellipse toward the optical axis and shifting a second portion of the ellipse away from the optical axis, and rotating a resulting curve about the optical axis;
wherein the first portion of the ellipse extends from a boundary point toward a positive direction of the optical axis, and the second portion extends from the boundary point toward a direction opposite the positive direction of the optical axis;
wherein the boundary point is a point on the ellipse such that when a ray of light that passes through the lamp valve and hits the boundary point is extended toward the optical axis, the extended ray intersects the light emitting element; and
wherein the positive direction of the optical axis is directed toward the predetermined focus point from the light emitting element.

4. The light source unit according to claim 3, wherein the lamp valve has a cross-section shaped as a convex lens.

5. A light source unit comprising:
a lamp comprising a light emitting element and a lamp valve enclosing the light emitting element; and
a reflector having a concave reflecting surface for reflecting rays of light emitted by the lamp so as to focus the rays on a predetermined focus point, said reflector being larger than the light emitting element;
wherein a position of the light emitting element and the predetermined focus point define two focal points of an ellipse, and an optical axis passes through the two focal points;
wherein the reflective surface has a shape defined by shifting a first portion of the ellipse away from the optical axis and shifting a second portion of the ellipse toward the optical axis, and rotating a resulting curve about the optical axis;
wherein the first portion of the ellipse extends from a boundary point toward a positive direction of the optical axis, and the second portion extends from the boundary point toward a direction opposite the positive direction of the optical axis;
wherein the boundary point is a point on the ellipse such that when a ray of light that passes through the lamp valve and hits the boundary point is extended toward the optical axis, the extended ray intersects the light emitting element; and
wherein the positive direction of the optical axis is directed toward the predetermined focus point from the light emitting element.

6. The light source unit according to claim 5, wherein the lamp valve has a cross-section shaped as a convex lens.

7. A display apparatus comprising:
(a) a light source unit which comprises:
a lamp comprising a light emitting element and a lamp valve enclosing the light emitting element; and
a reflector having a concave reflecting surface for reflecting rays of light emitted by the lamp so as to focus the rays on a predetermined focus point, said reflector being larger than the light emitting element;
wherein a position of the light emitting element and the predetermined focus point define two focal points of an ellipse, and an optical axis passes through the two focal points;
wherein the reflective surface has a shape defined by shifting a first portion of the ellipse toward the optical axis and shifting a second portion of the ellipse away from the optical axis, and rotating a resulting curve about the optical axis;
wherein the first portion of the ellipse extends from a boundary point toward a positive direction of the optical axis, and the second portion extends from the boundary point toward a direction opposite the positive direction of the optical axis;
wherein the boundary point is a point on the ellipse such that when a ray of light that passes through the lamp valve and hits the boundary point is extended toward the optical axis, the extended ray intersects the light emitting element; and
wherein the positive direction of the optical axis is directed toward the predetermined focus point from the light emitting element; and
(b) a display projector unit which comprises:
an illumination adjuster for receiving at the predetermined focus point the rays of light emitted by the light source unit, adjusting an illumination of the received rays of light, and passing the adjusted rays of light therethrough;
a relay lens system for guiding the rays of light from the illumination adjuster to a light-transparent chart; and
a projection lens system for projecting the rays of light from the light-transparent chart onto a screen.

8. A display apparatus comprising:
(a) a light source unit which comprises:
a lamp comprising a light emitting element and a lamp valve enclosing the light emitting element; and
a reflector having a concave reflecting surface for reflecting rays of light emitted by the lamp so as to focus the rays on a predetermined focus point, said reflector being larger than the light emitting element;
wherein a position of the light emitting element and the predetermined focus point define two focal points of an ellipse, and an optical axis passes through the two focal points;

wherein the reflective surface has a shape defined by shifting a first portion of the ellipse away from the optical axis and shifting a second portion of the ellipse toward the optical axis, and rotating a resulting curve about the optical axis;

wherein the first portion of the ellipse extends from a boundary point toward a positive direction of the optical axis, and the second portion extends from the boundary point toward a direction opposite the positive direction of the optical axis;

wherein the boundary point is a point on the ellipse such that when a ray of light that passes through the lamp valve and hits the boundary point is extended toward the optical axis, the extended ray intersects the light emitting element; and wherein the positive direction of the optical axis is directed toward the predetermined focus point from the light emitting element; and (b) a display projector unit which comprises:

an illumination adjuster for receiving at the predetermined focus point the rays of light emitted by the light source unit, adjusting an illumination of the received rays of light, and passing the adjusted rays of light therethrough;

a relay lens system for guiding the rays of light from the illumination adjuster to a light-transparent chart; and a projection lens system for projecting the rays of light from the light-transparent chart onto a screen.

9. A light source unit comprising:

a lamp comprising a light emitting element and a lamp valve enclosing the light emitting element; and a reflector having a concave reflective surface for reflecting rays of light emitted by the lamp so as to focus the rays on a predetermined focus point, said reflector being larger than the light emitting element;

wherein a position of the light emitting element and the predetermined focus point define two focal points of an ellipse, and an optical axis passes through the two focal points;

wherein a shape of the reflective surface is defined by rotating a curve about the optical axis, said curve including a first curve portion and a second curve portion separated by a boundary point that is shared by the curve and the ellipse;

wherein the first curve portion extends from the boundary point toward a positive direction of the optical axis and has a curvature that is smaller than a corresponding curvature of the ellipse, and wherein the second curve portion extends from the boundary point toward a direction opposite to the positive direction of the optical axis opposite and has a curvature larger than a corresponding curvature of the ellipse;

wherein the boundary point is a point on the ellipse such that when a ray of light that passes through the lamp valve and hits the boundary point is extended toward the optical axis, the extended ray intersects the light emitting element; and wherein the positive direction of the optical axis is directed toward the predetermined focus point from the light emitting element.

* * * * *